(12) United States Patent
Döbler et al.

(10) Patent No.: US 12,327,992 B2
(45) Date of Patent: Jun. 10, 2025

(54) CIRCUIT BREAKER DEVICE AND METHOD

(71) Applicant: Siemens Aktiengesellschaft, Munich (DE)

(72) Inventors: Fabian Döbler, Theilenhofen (DE); Christopher Fromme, Fürth (DE); Dominic Malane, Eichstätt (DE); Marvin Tannhäuser, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 51 days.

(21) Appl. No.: 18/258,602

(22) PCT Filed: Dec. 16, 2021

(86) PCT No.: PCT/EP2021/086047
§ 371 (c)(1),
(2) Date: Jun. 21, 2023

(87) PCT Pub. No.: WO2022/136078
PCT Pub. Date: Jun. 30, 2022

(65) Prior Publication Data
US 2024/0047961 A1 Feb. 8, 2024

(30) Foreign Application Priority Data
Dec. 21, 2020 (DE) .................... 10 2020 216 416.9

(51) Int. Cl.
*H02H 3/44* (2006.01)
*H02H 3/05* (2006.01)
*H02H 3/10* (2006.01)
*H02H 3/26* (2006.01)
*H02H 3/40* (2006.01)

(52) U.S. Cl.
CPC .............. *H02H 3/44* (2013.01); *H02H 3/05* (2013.01); *H02H 3/10* (2013.01); *H02H 3/26* (2013.01); *H02H 3/40* (2013.01)

(58) Field of Classification Search
CPC .............. H02H 3/08; H02H 3/10; H02H 3/26
See application file for complete search history.

(56) References Cited

U.S. PATENT DOCUMENTS

| 3,611,043 A | 10/1971 | Steen | |
|---|---|---|---|
| 5,151,638 A * | 9/1992 | Beckerman | H02H 3/382 |
| | | | 318/434 |

(Continued)

FOREIGN PATENT DOCUMENTS

| DE | 102007006564 A1 | 8/2008 |
|---|---|---|
| DE | 102016123955 A1 | 6/2018 |

(Continued)

OTHER PUBLICATIONS

Mützel, T.: Dissertation "Verfahren zur Kurzschlussfrüherkennung zur Verbesserung der strombegrenzenden Wirkung mechanischer Leistungsschalter im Kurzschlussfall" [Procedure for early short-circuit detection to improve the current-limiting effect of mechanical circuit breakers in the event of a short-circuit], 2008, Technische Universität Ilmenau—English abstract.

(Continued)

*Primary Examiner* — Peter M Novak
(74) *Attorney, Agent, or Firm* — Laurence A. Greenberg; Werner H. Stemer; Ralph E. Locher

(57) ABSTRACT

A method for protecting an electrical low-voltage circuit includes ascertaining the level of the voltage of the low-voltage circuit in the form of instantaneous voltage values. A change in the current is ascertained over time such that instantaneous current change values are provided. The instantaneous current change values are compared to instantaneous current change threshold values in order to recognize a short circuit in the low-voltage circuit, and if the current change thresholds are exceeded, an electronic interruption unit switches from the low-resistance state to the high-resistance state in order to interrupt the low-voltage (Continued)

current circuit. The process has a trigger time from the short circuit event to the high-resistance state. The trigger time is largely independent of the phase angle. A circuit breaker device for protecting an electrical low-voltage circuit is also provided.

22 Claims, 5 Drawing Sheets

(56) References Cited

U.S. PATENT DOCUMENTS 10,541,530 B2   1/2020   Kennedy et al.
2019/0371557 A1   12/2019   Haslinger
2020/0365346 A1   11/2020   Telefus et al.
2022/0337046 A1   10/2022   Erven

FOREIGN PATENT DOCUMENTS

DE   102019213604 A1   3/2021
GB   2520529 A   5/2015

OTHER PUBLICATIONS

Lindmayer, M. et al:. "Digitale Algorithmen zur frühzeitigen Kurzschlußerkennung", [Digital algorithms for early short-circuit detection], Elektrotechnische Zeitschrift ETZ, Issue: 112/13-14, 1991, pp. 718-722—English abstract.

* cited by examiner

CIRCUIT BREAKER DEVICE AND METHOD

FIELD AND BACKGROUND OF THE INVENTION

The invention relates to the technical field of a circuit breaker device for a low-voltage circuit having an electronic interruption unit and to a method for a circuit breaker device for a low-voltage circuit having an electronic interruption unit.

Low voltage is understood to mean voltages of up to 1000 volts AC or up to 1500 volts DC. Low voltage is understood in particular to mean voltages that are greater than extra-low voltage, with values of 50 volts AC or 120 volts DC.

A low-voltage circuit or grid or installation is understood to mean circuits with nominal currents or rated currents of up to 125 amperes, more specifically up to 63 amperes. A low-voltage circuit is understood to mean in particular circuits with nominal currents or rated currents of up to 50 amperes, 40 amperes, 32 amperes, 25 amperes, 16 amperes or 10 amperes. Said current values are understood to mean in particular nominal, rated or/and shutdown currents, that is to say the maximum current that is normally carried through the circuit or in the case of which the electrical circuit is usually interrupted, for example by a protection device, such as a circuit breaker device, miniature circuit breaker or power circuit breaker.

Miniature circuit breakers are overcurrent protection devices that have long been known and that are used in low-voltage circuits in electrical installation engineering. They protect lines against damage caused by heating due to excessively high current and/or a short circuit. A miniature circuit breaker may automatically shut down the circuit in the event of an overload and/or short circuit. A miniature circuit breaker is not a safety element that resets automatically.

In contrast to miniature circuit breakers, power circuit breakers are intended for currents greater than 125 A, in some cases also starting from 63 amperes. Miniature circuit breakers therefore have a simpler and more delicate design. Miniature circuit breakers usually have a fastening option for fastening to a so-called top-hat rail (carrier rail, DIN rail, TH35).

Miniature circuit breakers have an electromechanical design. In a housing, they have a mechanical switching contact or operating current tripping device for interrupting (tripping) the electric current. A bimetal protection element or bimetal element is usually used for tripping (interruption) in the event of a sustained overcurrent (overcurrent protection), respectively in the event of a thermal overload (overload protection). An electromagnetic tripping device with a coil is used for brief tripping in the event of an overcurrent limit value being exceeded or in the event of a short circuit (short circuit protection). One or more arc extinguishing chambers or arc extinguishing devices are provided. Connection elements for conductors of the electrical circuit to be protected are also provided.

Circuit breaker devices having an electronic interruption unit are relatively recent developments. They have a semiconductor-based electronic interruption unit. In other words, the electric current flow in the low-voltage circuit is guided via semiconductor components or semiconductor switches that are able to interrupt the electric current flow or are able to be switched to the on state. Circuit breaker devices having an electronic interruption unit often also have a mechanical isolating contact system, in particular with isolator properties in accordance with the applicable standards for low-voltage circuits, wherein the contacts of the mechanical isolating contact system are connected in series with the electronic interruption unit, that is to say the current of the low-voltage circuit to be protected is guided both through the mechanical isolating contact system and through the electronic interruption unit.

In the case of semiconductor-based circuit breaker devices or protection devices, or solid-state circuit breakers, SSCB for short, the switching energy does not, like in the case of a mechanical switching device, have to be converted into an arc, but rather converted into heat by way of an additional circuit, the energy absorber. The shutdown energy in this case comprises the energy stored in the circuit, that is to say in the grid impedances, line impedances or load impedances (consumer impedances). To unload the energy absorber, the current flowing at the time of shutdown has to be as low as possible. This also applies to the case of a short circuit. In this case, the current rises very quickly. Quickly recognizing a short circuit makes it possible to recognize a short circuit early and to avoid an excessively high short-circuit current. The semiconductor-based circuit breaker device interrupts the circuit almost without a delay, within μs, as part of a shutdown process. No high currents occur and the loading of the energy absorber of a semiconductor-based circuit breaker device is reduced. Known short-circuit recognitions or shutdown criteria are usually based on ascertaining and evaluating the current actual value.

The present invention relates to low-voltage AC circuits having an AC voltage, usually having a time-dependent sinusoidal AC voltage of frequency f, typically 50 or 60 hertz (Hz). The temporal dependency of the instantaneous voltage value u(t) of the AC voltage is described by the equation:

$$u(t) = U^* \sin(2\pi f^* t),$$

wherein:
u(t)=instantaneous voltage value at the time t
U=amplitude (maximum value) of the voltage A harmonic AC voltage may be represented by the rotation of a vector the length of which corresponds to the amplitude (U) of the voltage. The instantaneous deviation is in this case the projection of the vector onto a coordinate system. An oscillation period corresponds to a full revolution of the vector and its full angle is 2π (2 pi) or 360°. The angular frequency is the rate of change of the phase angle of this rotating vector. The angular frequency of a harmonic oscillation is always 2π times its frequency, that is to say:

$$\omega = 2\pi^* f = 2\pi/T = \text{angular frequency of the AC voltage}$$

(T=period duration of the oscillation).

It is often preferred to give the angular frequency (ω) rather than the frequency (f), since many formulae in oscillation theory are able to be represented more compactly using the angular frequency due to the occurrence of trigonometric functions the period of which is by definition 2π:

$$u(t) = U^* \sin(\omega t)$$

In the case of non-temporally constant angular frequencies, the term instantaneous angular frequency is also used.

21 In the case of a sinusoidal, in particular temporally constant, AC voltage, the time-dependent value formed from the angular velocity ω and time t corresponds to the time-dependent angle φ(t), which is also referred to as phase angle φ(t). In other words, the phase angle φ(t) periodically runs through the range 0 ... 2 π or 0° ... 360°. In other words, the phase angle periodically adopts a value between 0 and $2\pi$ or 0° and 360° ($\varphi=n*(0 \ldots 2\pi)$ or $\varphi=n*(0° \ldots 360°)$), owing to periodicity; for short: $\varphi=0 \ldots 2\pi$ or $\varphi=0° \ldots 360°$).

Instantaneous voltage value u(t) is therefore understood to mean the instantaneous value of the voltage at the time t, that is to say, in the case of a sinusoidal (periodic) AC voltage, the value of the voltage at the phase angle $\varphi$ ($\varphi=0 \ldots 2\pi$ or $\varphi=0° \ldots 360°$, of the respective period).

SUMMARY OF THE INVENTION

The object of the present invention is to improve a circuit breaker device of the type mentioned at the outset, in particular to provide a fast and alternative short circuit recognition possibility, and more specifically to achieve short and approximately constant trip times, and to guarantee safe interruption.

This object is achieved by a circuit breaker device having the features described below and by a method having the steps described below.

According to the invention, provision is made for an (electronic) circuit breaker device for protecting an electrical low-voltage circuit, in particular low-voltage AC circuit, having:

a housing having grid-side and load-side connections for conductors of the low-voltage AC circuit, a voltage sensor for ascertaining the level of the voltage of the low-voltage circuit such that instantaneous (phase angle-related) voltage values are present, a current sensor for ascertaining the level of the current of the low-voltage circuit such that instantaneous (phase angle-related) current values are present, an electronic interruption unit that, by virtue of semiconductor-based switching elements, has a high-resistance state of the switching elements so as to interrupt and a low-resistance state of the switching elements so as to allow a current flow in the low-voltage circuit, a control unit that is connected to the voltage sensor, the current sensor and the interruption unit, wherein the circuit breaker device is designed such that, upon recognition of an in particular load-side short circuit, the electronic interruption unit changes from the low-resistance state to the high-resistance state so as to interrupt the low-voltage circuit, wherein this process has a trip time from the short-circuit event to the high-resistance state, wherein the trip time is shorter than a temporal first threshold value.

According to the invention, the intention is to achieve a situation whereby a trip time that is fast and largely constant over the period duration of the AC voltage, that is to say lies below a temporal first threshold value, is achieved.

It is thereby advantageously possible to recognize short circuits very quickly, while avoiding high switching energy.

Advantageous embodiments of the invention are indicated in the dependent claims.

In one advantageous embodiment of the invention, the trip time is independent of the phase angle of the voltage, such that approximately the same trip times are achieved with a small instantaneous voltage and with a large instantaneous voltage. The trip time is in particular approximately constant over a full period duration of the voltage.

This has the particular advantage of achieving an even more uniform largely constant trip time.

In one advantageous embodiment of the invention, provision is made for a, in particular a single, setting element on the circuit breaker device, using which it is possible to set a limit value for the current rise in order to set the limit value for the short-circuit recognition.

This has the particular advantage that the setting is carried out for the short-circuit recognition not by a current threshold value but rather by a current rise threshold value or current change threshold value, that is to say setting of a short circuit recognition value that takes place (at least largely) independently of the absolute current.

In one advantageous embodiment of the invention, the limit value for the current rise is set depending on that part of the low-voltage circuit that is connected to the grid-side connection of the circuit breaker device.

This has the particular advantage of enabling load side-independent setting, that is to say in particular setting independent of the connected load or consumer, of the short-circuit recognition.

In one advantageous embodiment of the invention, the change in the current over time is ascertained from the instantaneous current values, such that instantaneous current change values are present.

This has the particular advantage that corresponding measured values are present for the short-circuit recognition.

In one advantageous embodiment of the invention, (periodic) instantaneous current change threshold values that are dependent on the (periodic) temporal characteristic of the level of the voltage, that is to say on the instantaneous voltage values, are present.

This has the particular advantage that threshold values/current change threshold values that are dependent on the periodicity of the voltage are present in order to achieve a largely uniform or constant trip time.

In one advantageous embodiment of the invention, the instantaneous current change values are compared with the instantaneous current change threshold values in terms of phase. In the event of the instantaneous current change threshold value being exceeded, interruption of the low-voltage circuit is initiated.

This has the particular advantage of being able to achieve a largely uniform or constant trip time.

In one advantageous embodiment of the invention, the (periodic) instantaneous current change threshold values have a minimum value that is greater than zero. This minimum value is in particular in the range of 5 to 20% of the maximum value, that is to say of the maximum current change threshold value.

This has the particular advantage, in the case of small current change values or small voltages, of enabling safe recognition of short-circuit currents and avoiding incorrect tripping.

In one advantageous embodiment of the invention, the low-voltage AC circuit has a temporally sinusoidal voltage characteristic (ideal case). The instantaneous current change threshold values likewise have a temporally sinusoidal current change characteristic, in particular in terms of absolute value. The zero-crossing or the region of the zero-crossing in particular has a minimum value (in terms of absolute value) that is greater than zero, in particular greater than 0.2 A/µs. The temporal characteristics of voltage and current change threshold values are synchronized in terms of phase such that the time of the amplitude (maximum value) of the voltage matches the time of the amplitude (maximum value) of the current change threshold value.

This has the particular advantage of enabling simple recognition in the case of (in particular) sinusoidal voltage characteristics.

In particular, the region of the zero-crossing of the voltage matches the region of the minimum value of the current change threshold value.

In one advantageous embodiment of the invention, the exceedance of the current change threshold value has to be present for a first time interval in order to initiate interruption of the low-voltage circuit.

This has the particular advantage of avoiding incorrect tripping and achieving greater reliability.

In one advantageous embodiment of the invention, the circuit breaker device is designed such that the control unit has an analog first subunit and a digital second subunit. The first subunit has a current comparator to which the instantaneous current change values and the instantaneous current change threshold values are supplied, the latter from the second subunit. The current change threshold values are provided in terms of phase by the second subunit in accordance with the temporal characteristic of the voltage. This makes it possible to compare the instantaneous current change values with the instantaneous current change threshold values in relation to the phase of the temporal characteristic of the voltage. As a result of this, it is possible to initiate interruption of the low-voltage circuit in the event of the current change threshold values being exceeded.

This has the particular advantage of a simple implementation of the solution.

In one advantageous embodiment of the invention, the circuit breaker device is designed such that provision is made for a grid synchronization unit. This ascertains at least one phase angle ($\varphi(t)$) of the voltage and, alternatively, the amplitude (U) of the voltage from the supplied instantaneous voltage values. Provision is made for a threshold value unit that is connected to the grid synchronization unit and possibly to the setting element such that instantaneous current change threshold values are ascertained using the phase angle ($\varphi(t)$) of the voltage, the amplitude (U) of the voltage and the in particular set limit value for the current rise. The instantaneous current change values are compared with the instantaneous current change threshold values in terms of phase so as to ascertain initiation of an interruption.

This has the particular advantage of a further simple implementation of the solution.

In one advantageous embodiment of the invention, provision is made for a mechanical isolating contact system that is connected in series with the electronic interruption unit in the circuit, such that it is possible to switch galvanic isolation in the low-voltage circuit. The mechanical isolating contact system is connected to the control unit. This has the particular advantage that it is possible to achieve both fast interruption of the electrical low-voltage AC circuit by way of the electronic interruption unit and galvanic isolation, in particular with isolator properties according to standards, that is to say activation (in contrast to a shutdown). A comprehensive circuit breaker device is thus present.

Advantageously, in addition to interruption by the electronic interruption unit, galvanic interruption is also initiated by the mechanical isolating contact system.

In one advantageous embodiment of the invention, in the event of a high-resistance electronic interruption unit, or an electronic interruption unit switched to the high-resistance state, and a current in the low-voltage circuit that exceeds a first current threshold value, galvanic isolation is initiated.

This has the particular advantage of allowing activation of the circuit in the event of residual currents or a defective electronic interruption unit, that is to say increased safety is provided.

According to the invention, what is claimed is a corresponding method for a circuit breaker device for a low-voltage circuit having electronic (semiconductor-based) switching elements, having the same and further advantages.

In the method for protecting an electrical low-voltage circuit:
the level of the voltage of the low-voltage circuit is ascertained in the form of instantaneous voltage values,
the change in the current over time is ascertained, such that instantaneous current change values are present,
the instantaneous current change values are compared with instantaneous current change threshold values so as to recognize a short circuit in the low-voltage circuit and, in the event of the current change threshold values being exceeded, an electronic interruption unit will change from the low-resistance state to the high-resistance state so as to interrupt the low-voltage circuit, wherein this process has a trip time from the short-circuit event to the high-resistance state. The trip time is in this case shorter than a temporal first threshold value.

In one advantageous embodiment of the invention, the instantaneous current change values are compared with the instantaneous current change threshold values in terms of phase, wherein the instantaneous current change threshold values are synchronized with the temporal characteristic of the instantaneous voltage values, such that small instantaneous current change threshold values are present in the case of a small instantaneous voltage and high current change threshold values are present in the case of a high instantaneous voltage, such that the trip time is largely independent of the phase angle of the voltage or such that the trip time lies below the temporal first threshold value.

In one advantageous embodiment of the invention, the instantaneous current change threshold values have a minimum value that is greater than zero, in particular greater than 5 to 20% of the maximum value.

In one advantageous embodiment of the invention, in the case of a temporally sinusoidal voltage characteristic in the low-voltage AC circuit, the instantaneous current change threshold values have a temporally sinusoidal current change characteristic, in particular in terms of absolute value, with a minimum value that is greater than zero. The temporal characteristics of voltage and current change threshold values are synchronized in terms of phase such that the time of the amplitude of the voltage matches the time of the amplitude of the current change threshold value.

All embodiments, both in dependent form referring back to the independent patent claims, and referring back only to individual features or combinations of features of patent claims, bring about an improvement in a circuit breaker device for fast and safe shutdown in the event of overcurrents and short circuits.

The described properties, features and advantages of this invention and the way in which these are achieved will become clearer and more clearly comprehensible in connection with the following description of the exemplary embodiments, which are explained in more detail in connection with the drawing.

DETAILED DESCRIPTION OF THE INVENTION

Figure 1:
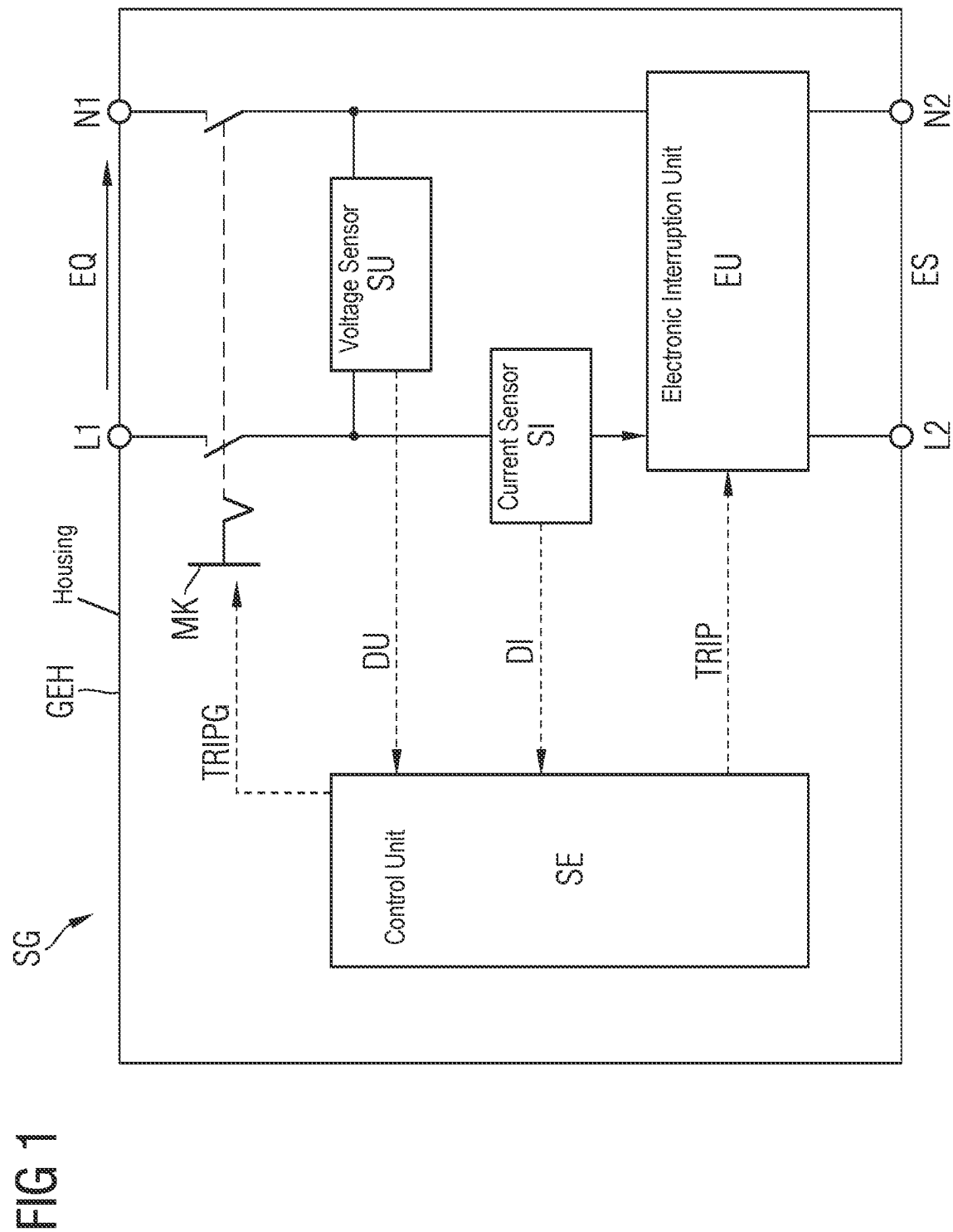
FIG. 1 shows an illustration of a circuit breaker device.

FIG. 1 shows an illustration of a circuit breaker device SG for protecting an electrical low-voltage circuit having a housing GEH, having:
- connections for conductors of the low-voltage circuit, in particular first connections L1, N1 for a grid-side, in particular energy source-side, connection EQ of the circuit breaker device SG and second connections L2, N2 for a load-side, in particular energy sink-side in the case of passive loads, connection ES (consumer-side connection) of the circuit breaker device SG, wherein provision may be made specifically for phase conductor-side connections L1, L2 and neutral conductor-side connections N1, N2;
- the load-side connection may have a passive load (consumer) or/and an active load ((further) energy source), or a load, which may be both passive and active, for example in a time sequence;
- a voltage sensor SU for ascertaining the level of the voltage of the low-voltage circuit such that instantaneous voltage values (phase-related voltage values) DU are present,
- a current sensor SI for ascertaining the level of the current of the low-voltage circuit such that instantaneous (phase angle-related) current values are present, in one embodiment, the current sensor SI may be designed such that the change in the current over time is ascertained from the instantaneous current values, such that instantaneous current change values DI are present; alternatively, this may take place in a separate unit or a control unit SE (described below),
- an electronic interruption unit EU that, by virtue of semiconductor-based switching elements, has a high-resistance state of the switching elements so as interrupt and a low-resistance state of the switching elements so as to allow a current flow in the low-voltage circuit,
- a control unit SE that is connected to the voltage sensor, the current sensor SI and the electronic interruption unit EU;
- the control unit SE may:
- be implemented with a digital circuit, for example with a microprocessor; the microprocessor may also contain an analog part;
- be implemented with a digital circuit having analog circuit parts.

The circuit breaker device SG, in particular the control unit SE, is designed such that, upon recognition of an in particular load-side (ES) short circuit, the electronic interruption unit EU changes from the low-resistance state to the high-resistance state so as to interrupt the low-voltage circuit, wherein this process has a trip time from the short-circuit event to the high-resistance state. According to the invention, the trip time is shorter than a temporal first threshold value. The first threshold value is shorter than 1 ms, specifically shorter than 200 μs, in particular shorter than 100 μs.

According to the invention, the intention is to achieve a situation whereby the trip time does not become greater than 1 ms or 200 μs/100 μs over a full period duration of the voltage. If the recognition takes place more quickly, tripping should also be carried out more quickly (it should then not be made slower). The stated temporal first threshold value constitutes a maximum time for slow fault cases, that is to say when the driving voltage is still low, for example 50 volts, the current change value (in the fault case) is thus likewise small (in the case of a grid-side inductor/loop inductance/energy source with lines to the short circuit of 100 μH), for example 0.5 A/μs.

The concomitant adaptation of the current change threshold values according to the invention may thus be used to quickly recognize a fault case at low instantaneous voltages.

A current change threshold value fixedly set to be this small would otherwise promote incorrect tripping (at high instantaneous voltages).

According to the invention, the trip time is short, in particular (largely) independent of the phase angle of the voltage, such that approximately the same trip times are achieved with a small instantaneous voltage and with a large instantaneous voltage.

This is achieved according to the invention for example in that (periodic) instantaneous current change threshold values that are dependent on the (periodic) temporal characteristic of the level of the voltage, or the ascertained instantaneous voltage values, are present.

The instantaneous current change threshold values may be present continuously or phase angle-wise.

The instantaneous current change threshold values may in this case be present per individual phase angle, a phase angle range (multiple phase angles), for example every 2°, or a phase angle section (part of a phase angle), for example every 0.5° or 0.1°. In particular, a resolution of 1° to 5° is particularly advantageous (this corresponds to a sampling rate of 3.5 to 20 kHz).

The instantaneous current change values are compared with the instantaneous current change threshold values in terms of phase. In the event of the instantaneous current change threshold value being exceeded in terms of absolute value, interruption of the low-voltage circuit is initiated, for example by a first interruption signal TRIP from the control unit SE to the electronic interruption unit EU, as illustrated in FIG. 1.

The electronic interruption unit EU is illustrated as a block in both conductors according to FIG. 1. In a first variant, this is understood to mean no interruption of the two conductors. At least one conductor, in particular the active conductor or phase conductor, has semiconductor-based switching elements. The neutral conductor may be free from switching elements, that is to say without semiconductor-based switching elements. In other words, the neutral conductor is connected directly, that is to say does not become highly resistive. In other words, only a single-pole interruption (of the phase conductor) takes place. If further active conductors/phase conductors are provided, in a second variant of the electronic interruption unit EU, the phase conductors have semiconductor-based switching elements. The neutral conductor is connected directly, that is to say does not become highly resistive. This is the case for example for a three-phase AC circuit.

In a third variant of the electronic interruption unit EU, the neutral conductor may likewise have a semiconductor-based switching element, that is to say, in the event of an interruption of the electronic interruption unit EU, both conductors become highly resistive.

The electronic interruption unit EU may have semiconductor components such as bipolar transistors, field-effect transistors (FETs), insulated-gate bipolar transistors (IG- BTs), metal oxide-semiconductor field-effect transistors (MOSFETs) or other (self-commutated) power semiconductors. IGBTs and MOSFETs are particularly suitable for the circuit breaker device according to the invention due to low forward resistances, high blocking layer resistances and good switching behavior.

In addition, for one embodiment of the invention, provision may furthermore be made for a current sensor SI for ascertaining the level of the current of the low-voltage circuit, such that current values DI are present, as illustrated in the example according to FIG. 1. The current sensor SI is then connected to the control unit SE.

The circuit breaker device SG may preferably furthermore have a mechanical isolating contact system MK, in particular according to standards with standard-compliant isolator properties, in order to galvanically isolate the circuit, in particular in order to activate (in contrast to shut down) the circuit in a standard-compliant manner. The mechanical isolating contact system MK may be connected to the control unit SE, as illustrated in FIG. 1, such that the control unit SE is able to initiate galvanic isolation of the circuit.

Specifically, a further evaluation may be implemented that brings about galvanic isolation when other criteria are met. By way of example, provision may be made for overcurrent recognition, for example in the control unit SE, such that, in the event of overcurrents, that is to say in the event of current time limit values being exceeded, that is to say when a current that exceeds a current limit value is present for a particular time, that is to say for example exceeds a particular energy threshold value, semiconductor-based or/and galvanic interruption of the circuit takes place.

As an alternative or in addition, galvanic isolation may also be initiated for example in the event of a recognized short circuit.

The galvanic interruption of the low-voltage circuit is initiated for example by a further second interruption signal TRIPG that is transmitted from the control unit SE to the mechanical isolating contact system MK, as illustrated in FIG. 1.

In a further advantageous embodiment, in the event of a high-resistance electronic interruption unit EU or electronic interruption unit EU switched to the high-resistance state, that is to say when the electronic interruption unit EU is supposed to be in a high-resistance state, and a current in the low-voltage circuit that is identified in particular by the current sensor SI and that exceeds a first current threshold value, galvanic isolation may be initiated. Depending on the field of use of the circuit breaker device, the first current threshold value may be of the order of magnitude of 4 to 6 mA, in particular be 5 mA or 6 mA. The first current threshold value may be in the range of 25 mA to 32 mA, in particular be 28 mA, 29 mA or 30 mA, in particular for personal protection in Europe. The third threshold value may be in the range of 290 mA to 300 mA, in particular for fire protection. All of the stated bounding and intermediate values are disclosed.

In a further advantageous embodiment, in the event of an ascertained current level that exceeds a second current threshold value, interruption of the low-voltage circuit may be initiated, in particular by the mechanical isolating contact system.

The second current threshold value corresponds for example to the standard-compliant current-(time) limit values, that is to say the I-(t) characteristic curves for circuit breakers, for example in accordance with standard IEC 60947 or IEC 60898. The selected current-(time) limit values are selected by a person skilled in the art according to the application in question.

In a further advantageous embodiment, in the event of initiation of interruption of the low-voltage circuit by way of the electronic interruption unit and a current flow in the low-voltage circuit that exceeds a third current threshold value and persists for a second time interval, interruption of the low-voltage circuit may be initiated by the mechanical isolating contact system in order for example to bring about interruption by the mechanical isolating contact system in the event of failed high resistance of the electronic interruption unit and thus failed interruption of the low-voltage circuit. This advantageously increases operational safety.

Such a process may advantageously be indicated on the circuit breaker device.

The third current threshold value and the second time interval correspond for example to the standard-compliant current-time limit values, that is to say the I-t characteristic curves for circuit breakers, for example in accordance with standard IEC 60947 or IEC 60898. The selected current-time limit values are selected by a person skilled in the art according to the application in question.

The mechanical isolating contact system MK may perform single-pole interruption in a first variant. In other words, only one conductor of the two conductors, in particular the active conductor or phase conductor, is interrupted, that is to say has a mechanical contact. The neutral conductor is then free from contacts, that is to say the neutral conductor is connected directly.

If further active conductors/phase conductors are provided, in a second variant, the phase conductors have mechanical contacts of the mechanical isolating contact system. In this second variant, the neutral conductor is connected directly. This is the case for example for a three-phase AC circuit.

In a third variant of the mechanical isolating contact system MK, the neutral conductor likewise has mechanical contacts, as illustrated in FIG. 1.

A mechanical isolating contact system MK is understood to mean in particular a (standard-compliant) isolating function, performed by the isolating contact system MK. Isolating function is understood to mean the following points:
- minimum clearance in air according to standards (minimum distance between the contacts),
- contact position indication for the contacts of the mechanical isolating contact system,
- actuation of the mechanical isolating contact system is always possible (no blocking of the isolating contact system).

With regard to the minimum clearance in air between the contacts of the isolating contact system, this is essentially voltage-dependent. Other parameters are the pollution degree, the type of field (homogeneous, inhomogeneous) and air pressure or height above sea level.

There are corresponding rules or standards for these minimum clearances in air or creepage paths. These rules stipulate for example, in the case of air for a surge withstand capability, the minimum clearance in air for an inhomogeneous and a homogeneous (ideal) electric field on the basis of the pollution degree. The surge withstand capability is the withstand capability when a corresponding surge voltage is applied. The isolating contact system or circuit breaker device has an isolating function (isolator property) only in the presence of this minimum length (minimum clearance).

Within the scope of the invention, the DIN EN 60947 and IEC 60947 series of standards are relevant to the isolator function and the properties thereof in this case, to which standards reference is made here.

The isolating contact system is advantageously characterized by a minimum clearance in air between the open isolating contacts in the OFF position (open position, open contacts) on the basis of the rated impulse withstand voltage and the pollution degree. The minimum clearance in air is in particular between (at least) 0.01 mm and 14 mm. The minimum clearance in air is in particular advantageously between 0.01 mm at 0.33 kV and 14 mm at 12 kV, in particular for pollution degree 1 and in particular for inhomogeneous fields.

Advantageously, the minimum clearance in air may have the following values:

E DIN EN 60947-1 (VDE 0660-100):2018-06

TABLE 13

Minimum clearances in air

| Rated impulse withstand voltage $U_{imp}$ | Case A Inhomogeneous field conditions (see 3.7.63) Pollution degree | | | | Case B Homogeneous field ideal conditions (see 3.7.62) Pollution degree | | | |
|---|---|---|---|---|---|---|---|---|
| kV | 1 | 2 | 3 | 4 | 1 | 2 | 3 | 4 |
| 0.33 | 0.01 | 0.2 | 0.8 | 1.6 | 0.01 | 0.2 | 0.8 | 1.6 |
| 0.5 | 0.04 | | | | 0.04 | | | |
| 0.8 | 0.1 | | | | 0.1 | | | |
| 1.5 | 0.5 | 0.5 | | | 0.3 | 0.3 | | |
| 2.5 | 1.5 | 1.5 | 1.5 | | 0.6 | 0.6 | | |
| 4.0 | 3 | 3 | 3 | 3 | 1.2 | 1.2 | 1.2 | |
| 6.0 | 5.5 | 5.5 | 5.5 | 5.5 | 2 | 2 | 2 | 2 |
| 8.0 | 8 | 8 | 8 | 8 | 3 | 3 | 3 | 3 |
| 12 | 14 | 14 | 14 | 14 | 4.5 | 4.5 | 4.5 | 4.5 |

NOTE
The values of minimum clearances in air are based on 1.2/50 μs impulse voltage, for barometric pressure of 80 kPa, equivalent to normal atmospheric pressure at 2 000 m above sea level.

The pollution degrees and field types correspond to those defined in the standards. This advantageously makes it possible to achieve a standard-compliant circuit breaker device dimensioned in accordance with the rated impulse withstand voltage.

Figure 2:
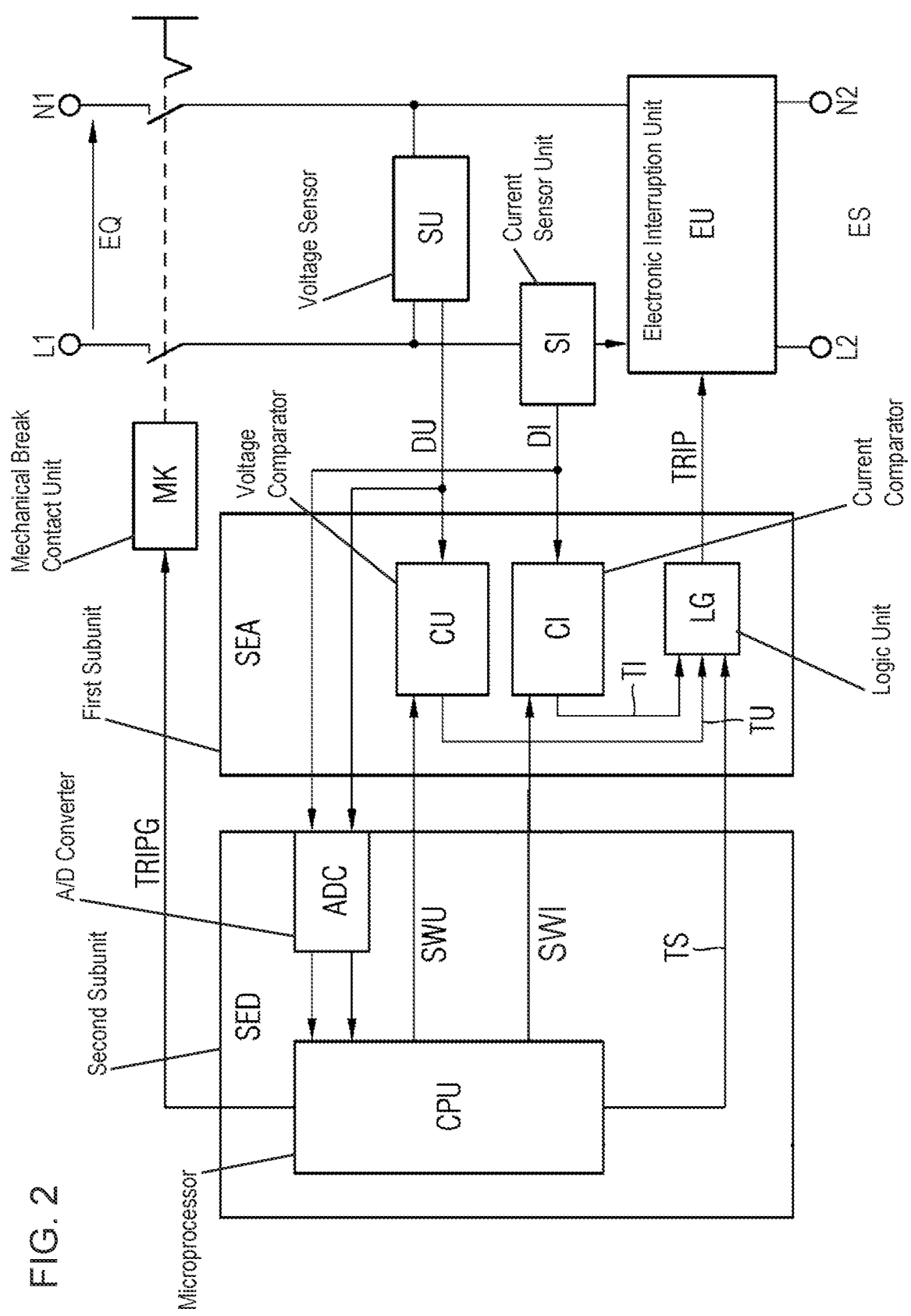
FIG. 2 shows a first embodiment of the circuit breaker device.

FIG. 2 shows an illustration according to FIG. 1, with a more detailed embodiment. Here, the control unit SE has two subunits; a preferably analog first subunit SEA and a preferably digital second subunit SED. The first subunit SEA in this case has a current comparator CI. This is supplied with the instantaneous current change values DI from the current sensor SI, on the one hand. On the other hand, the current comparator CI is supplied with the instantaneous current change threshold values SWI from the second subunit SED.

The current comparator CI compares the instantaneous current change values DI with the instantaneous current change threshold values SWI and outputs, as described, in the event of exceedance, a first current interruption signal TI so as to initiate interruption of the low-voltage circuit.

The current interruption signal TI may be supplied to a logic unit LG, which combines it with other interruption signals and outputs the first interruption signal TRIP for semiconductor-based interruption or high-resistance interruption to the electronic interruption unit EU.

In one embodiment, the current comparator CI buffer stores the instantaneous threshold values SWI in order to have the values constantly available.

The instantaneous current change threshold values SWI are synchronized with the temporal characteristic of the instantaneous voltage values (the temporal characteristic of the voltage). As a result, in the case of a small instantaneous voltage (phase angle of a sinusoidal AC voltage of for example −30° to 0° to 30°), small instantaneous current change threshold values SWI are used (or are present) and, in the case of a high instantaneous voltage (phase angle of a sinusoidal AC voltage of for example 60° to 90° to 120°), high current change threshold values SWI are used (or are present), meaning that the trip time is largely independent of the phase angle of the voltage, and so the trip time is below the temporal first threshold value.

The instantaneous current change values DI are additionally supplied to the second subunit SED. In one preferred embodiment, the instantaneous current change values DI are digitized there by an analog-to-digital converter ADC and supplied to a microprocessor CPU. This ascertains or computes the instantaneous current change threshold values SWI. The instantaneous current change threshold values SWI ascertained by the second subunit SED or in particular the microprocessor CPU are in turn supplied to the first subunit SEA, in particular to the current comparator CI, in order to perform the comparison described above.

In this case, the instantaneous current change threshold values SWI may advantageously be ascertained digitally in the second subunit SED or with a slower processing speed than the continuous comparison of instantaneous current change values DI with the instantaneous current change threshold values SWI in the first subunit SEA.

In one advantageous embodiment of the invention, the first subunit SEA may have a voltage comparator CU. This is supplied with the instantaneous voltage values DU of the voltage sensor SU, on the one hand. On the other hand, the voltage comparator CU is supplied with instantaneous voltage threshold values SWU by the second subunit SED.

The voltage comparator CU compares the instantaneous voltage values DU with the instantaneous voltage threshold values SWU and, in the event of exceedance or undershoot or a range check, outputs a voltage interruption signal TU so as to initiate interruption of the low-voltage circuit.

The voltage interruption signal TU may be supplied to the logic unit LG, which combines it with the one or more other interruption signals and outputs the first interruption signal TRIP for the semiconductor-based interruption or high-resistance interruption to the electronic interruption unit EU.

In one embodiment, the voltage comparator CU buffer stores the instantaneous threshold values SWU in order to have the values constantly available.

In this embodiment, the instantaneous voltage values DU may additionally be supplied to the second subunit SED. In a further preferred embodiment, the instantaneous voltage values DU are digitized there by the analog-to-digital converter ADC and supplied to the microprocessor CPU. This ascertains or computes the instantaneous voltage threshold values SWU. The instantaneous voltage threshold values SWU ascertained by the second subunit SED or in particular the microprocessor CPU are in turn supplied to the first subunit SEA, in particular to the voltage comparator CU, in order to perform the comparison described above.

In this case, the instantaneous voltage threshold values SWU may advantageously be ascertained digitally in the second subunit SED or at a slower processing speed than the continuous comparison of instantaneous voltage values DU and instantaneous voltage threshold values SWU in the first subunit SEA.

Depending on the embodiment, a second interruption signal TRIPG may be output by the second subunit SED of the control unit SE, in particular by the microprocessor CPU, to the mechanical isolating contact system MK so as to galvanically interrupt the low-voltage circuit, as illustrated in FIG. 2.

The embodiment of the control unit with an analog first subunit and a digital second subunit has the particular advantage that an efficient architecture is present. The first analog subunit is able to perform a very fast comparison of instantaneous values and threshold values, thereby enabling fast short-circuit recognition. The second subunit may perform a threshold value computation or adaptation that is independent thereof and that does not have to be performed as quickly as the recognition. The threshold values may for example be buffer stored in order to be available for a fast comparison. The threshold values do not have to be adapted constantly.

The combination of current change values and voltage values additionally makes it possible to achieve higher evaluation certainty.

Figure 3:
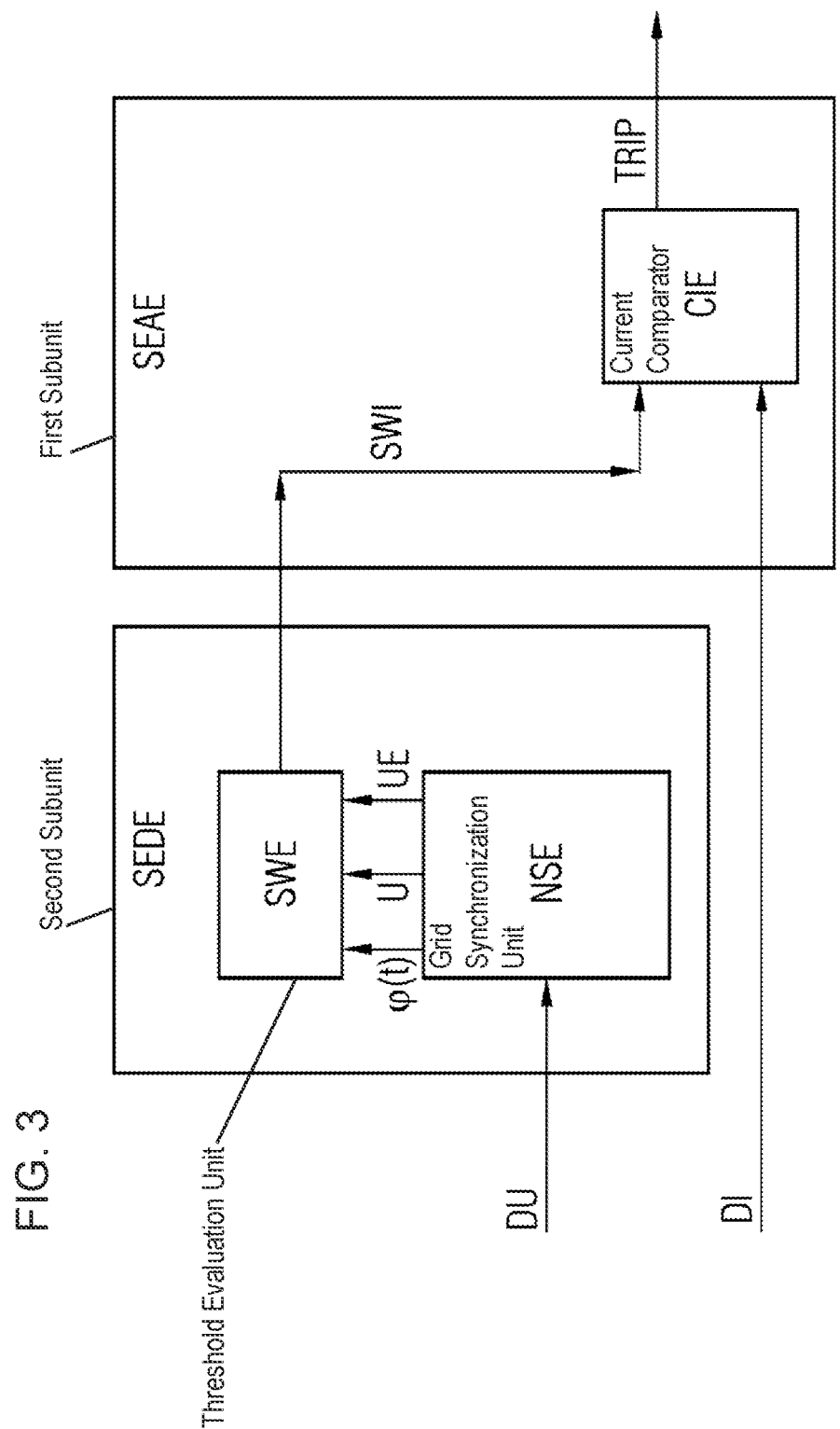
FIG. 3 shows a second embodiment of the circuit breaker device.

FIG. 3 shows a further embodiment or variant according to FIG. 1 and FIG. 2. FIG. 3 shows part of a simple variant of the preferably analog first subunit SEAE and part of an alternative variant of the preferably digital second subunit SEDE.

The part of the simple variant of the first subunit SEAE has the current comparator CIE, to which the instantaneous current change values DI, in particular their absolute value, and the instantaneous current change threshold values SWI, in particular also in terms of absolute value, are supplied. The current comparator CIE in this example directly outputs the first interruption signal TRIP so as to interrupt the low-voltage circuit, in the same way as FIG. 2. The absolute value may be computed by one or further units that are not illustrated.

The part of the alternative variant of the second subunit SEDE has a grid synchronization unit NSE. This is supplied with the (analog) instantaneous voltage values DU. The grid synchronization unit NSE ascertains, from the supplied (analog) instantaneous voltage values DU, which are for example a sinusoidal AC voltage of the low-voltage circuit, the phase angle φ(t) of the voltage.

As an alternative, the amplitude U and an expected temporal value of the voltage UE or expected value of the voltage UE may also additionally be ascertained.

The expected value of the voltage UE is in this case a type of filtered or regenerated or generated equivalent instantaneous voltage value DU.

The phase angle φ(t) (and also the expected value of the voltage UE or the amplitude U) of the voltage DU may for example be ascertained by a so-called phase-locked loop or PLL for short. A PLL is an electronic circuit arrangement that influences the phase and thus accordingly the frequency of a changeable oscillator via a closed control loop such that the phase difference between an external periodic reference signal (instantaneous voltage values) and the oscillator or a signal derived therefrom is as constant as possible.

This makes it possible to ascertain inter alia the phase angle φ(t), the fundamental frequency and the amplitude thereof of the supplied grid voltage, that is to say the ascertained voltage values, that is to say for example also the (untouched or filtered) expected value of the (grid) voltage.

The phase angle φ(t) ascertained by the grid synchronization unit NSE (and possibly the amplitude U or/and the expected temporal value of the voltage UE) are supplied to a threshold value unit SWE. The threshold value unit SWE may have a (scaled) curve for the (phase-related) instantaneous current change threshold values SWI. By way of example, in the case of a sinusoidal AC voltage of the low-voltage circuit, an (approximately) sinusoidal current change threshold value curve, that is to say a characteristic that is sinusoidal in terms of height of the instantaneous current change threshold values SWI over the phase angles 0° to 360° or the period duration (or the (corresponding) time).

The circuit breaker device SG may have a, in particular a single, setting element. This in particular single setting element on the circuit breaker device SG makes it possible to set a limit value for the current rise. As an alternative, the limit value for the current rise may also be fixedly prescribed or programmed.

According to the invention, the current change threshold value curve is then scaled with regard to this limit value for the current rise as set or fixedly prescribed by way of the setting element. By way of example, the amplitude (that is to say the maximum value) of the current change threshold value curve may be scaled with the limit value for the current rise.

By way of example, the limit value for the current rise may be settable or fixedly prescribed in the range 0.1 A/µs to 5 A/µs. In particular, values of 0.1 A/µs to 1 A/µs are particularly advantageous for weaker grids (typically 0.5 to kA connection power). In particular, values of 1 A/µs to 5 A/µs are particularly advantageous for more powerful/rigid grids (typically 6 to 36 kA connection power).

According to the invention, the limit value for the current rise is set depending on that part of the low-voltage circuit that is connected to the grid-side connection of the circuit breaker device. That is to say, the grid side, in particular energy source side, according to the invention defines the level of the limit value for the current rise (and not, as is otherwise conventional, the load side or consumer side) in order to enable fast short-circuit recognition. The limit value is defined in particular by the grid-side inductances or ohmic components or the infeed power (driving energy). For example, for a 10 kA grid or low-voltage AC circuit with inductances of approximately 50 µH, in the short-circuit case at 300 volts instantaneous voltage value, the current rise is approximately 6 A/µs. In other words, with a set (maximum) limit value for the current rise of 5 A/µs for example for the amplitude (at 325 V) (or better 1 A/µs) and corresponding scaling of the curve, at 300 volts with an angle of approximately 67°, the current change limit value would be 4.6 A/µs (at 5 A/µs @ 325 V)) (or 0.92 A/µs (at 1 A/µs @ 325 V)). In other words, in such a short-circuit event, the circuit would be safely and quickly interrupted.

For example, for a 6 kA grid or low-voltage AC circuit with inductances of approximately 100 pH, in the short-circuit case at 300 volts instantaneous voltage value, the current rise is approximately 3 A/µs. In other words, with a set (maximum) limit value for the current rise of 1 A/µs and corresponding scaling of the curve, at 300 volts with an angle of approximately 67°, the current change limit value would be 0.92 A/µs (at 1 A/µs) (or 0.92 A/µs (at 1 A/µs @ 325V)). In other words, in such a short-circuit event in the 6 kA grid, the circuit would be safely and quickly interrupted. This is the case in smaller grids of 1 and 2 kA with correspondingly (smaller) adapted values.

The instantaneous current change threshold values SWI, owing to the presence of the phase angle φ(t) of the voltage in the threshold value unit SWE, may be transmitted thereby, synchronously with the instantaneous current change value DI, to the current comparator CIE, such that a phase-related (phase angle-related) comparison between the instantaneous current change value DI and the instantaneous current change threshold value SWI may take place.

Figure 4:
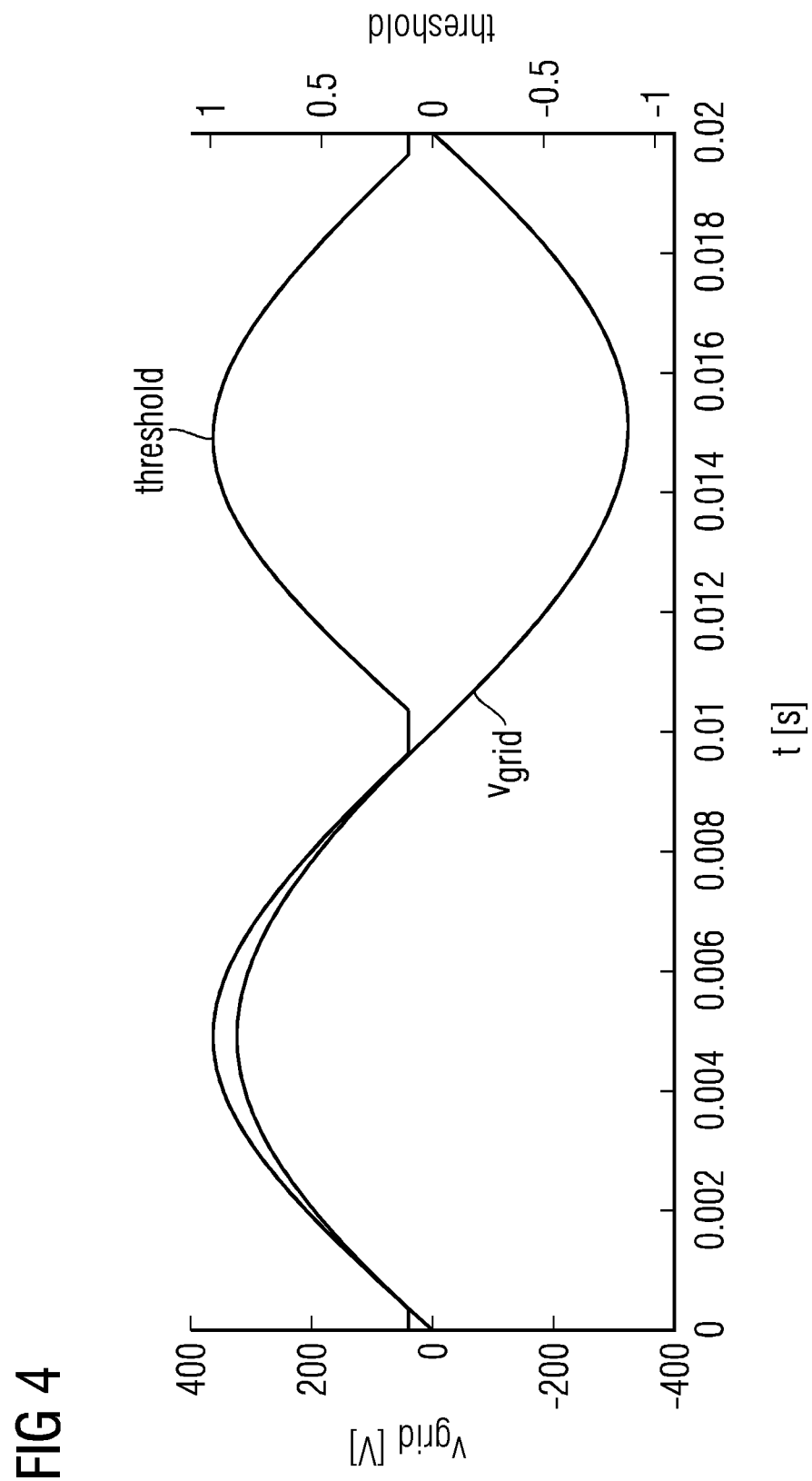
FIG. 4 shows voltage and current change threshold value characteristics over time.

FIG. 4 shows, on the one hand, the characteristic of the level of the voltage Vgrid in volts [V], on the left-hand vertical axis, of a period of a sinusoidal AC voltage over time t in s [s], on the horizontal axis, for example of a sinusoidal AC voltage in the low-voltage AC circuit. In this case, the instantaneous voltage values of the voltage are indicated over time, with time being proportional to the phase angle (f=50 Hz).

On the other hand, said figure shows a phase angle-related or phase angle-dependent (absolute value) scaled (0 to 1) instantaneous current change threshold value threshold, on the right-hand vertical axis, over time t in s [s]. The temporal (scaled) characteristic of the instantaneous current change threshold values threshold in this case corresponds to the (phase angle-related) instantaneous current change threshold values SWI.

The temporal (scaled) characteristic of the instantaneous current change threshold values threshold is scaled in accordance with the limit value for the current rise according to the invention as set or fixedly prescribed by way of the setting element. For example, the amplitude (scaling 1) is set to 5 A/µs.

Generally speaking, the characteristic of the instantaneous current change threshold values threshold corresponds to the characteristic of the voltage in the circuit, as illustrated in FIG. 4. In other words, for example in the case of a triangular voltage characteristic, a triangular current change threshold value curve would be used. The background is that the level of the voltage defines the level of the (short-circuit) current rise. According to the invention, in the case of a low voltage, low threshold values are therefore used and, in the case of a high voltage, high threshold values are used in order to enable fast, phase angle-independent short circuit recognition. Due to the use of current change values, that is to say the change in the level of the current over time, that is to say the di/dt, according to the invention, there is additionally no dependency on the absolute current level.

According to FIG. 4, the (periodic) instantaneous current change threshold values SWI have a minimum value. In other words, the sinusoidal curve is not ideal. The minimum value is greater than zero. The minimum value is in the range of 5 to 20% of the maximum value, for example (at) 10% or 15%, that is to say the amplitude of the current change threshold value curve threshold. The minimum value occurs at the location or in the region of the zero-crossing of the (sinusoidal) curve for the current change threshold values.

In the case of a temporally sinusoidal voltage characteristic in the low-voltage AC circuit, the temporal characteristics of voltage and current change threshold values are synchronized in terms of phase such that the time of the amplitude (maximum value) of the voltage matches the time of the amplitude (maximum value) of the current change threshold value, as shown in FIG. 4.

The region of the zero-crossing of the voltage also matches the region of the minimum value of the current change threshold value.

Figure 5:
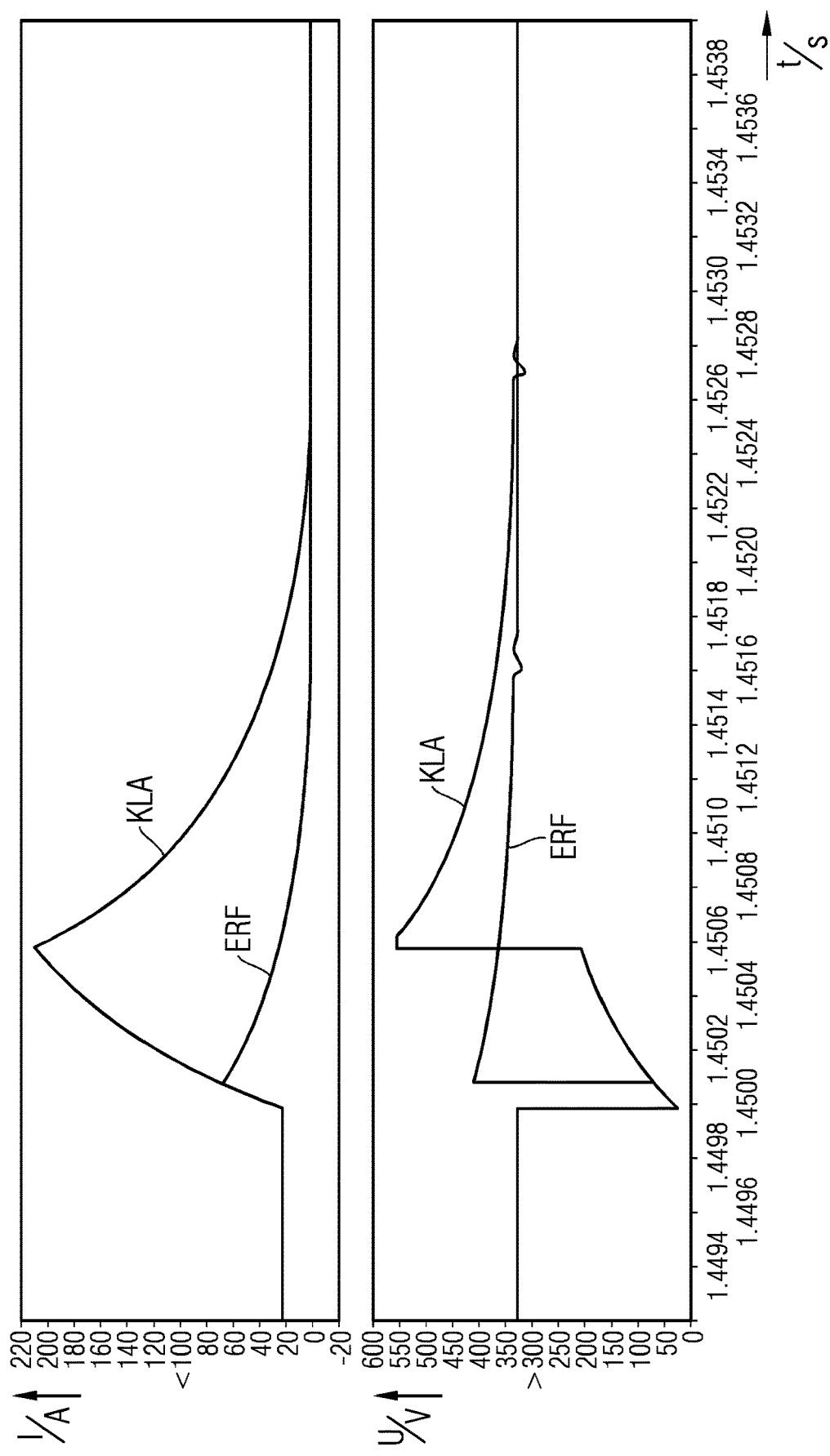
FIG. 5 shows current and voltage characteristics over time.

FIG. 5 shows characteristics of current I in amperes A (at the top) and voltage U in volts V (at the bottom)—on the vertical y-axis—against time t in seconds s—on the horizontal x-axis. The simulated comparison of the temporal characteristic ERF of the proposed invention is illustrated against the temporal characteristic KLA of a simple (conventional) overcurrent shutdown. A short circuit occurs at t=145 ms. The current I increases with greater steepness and at the same time the measured voltage U suddenly collapses.

The temporal characteristic KLA of the simple overcurrent shutdown that interrupts the current flow when 200 A is exceeded. Due to latencies and shutdown times, the current however rises for a short time after the limit value has been exceeded.

The temporal characteristic ERF of the short-circuit recognition according to the invention is based on recognizing the phase angle-related level of the current change, which is achieved through the phase-accurate comparison in terms of phase angle with current change threshold values, wherein the phase angle-related current change threshold values are synchronized with the (driving) voltage.

The phase angle resolution defines the speed of the computing of the threshold values. With a phase angle resolution of 1°, that is to say a threshold value is present for each full phase angle of the voltage, that is to say an instantaneous threshold value is present roughly every 55.5 µs. The shutdown is preferably performed by an analog comparator, that is to say continuously, and is thus significantly faster (for example in the nanosecond range) than the phase angle resolution.

As an alternative, the following temporal characteristic applies in the case of fully digital processing. The phase angle resolution defines the speed of the recognition. With a phase angle resolution of 1°, that is to say a threshold value is present for each full phase angle of the voltage, that is to say an instantaneous threshold value is present roughly every 55.5 µs, this means that shutdown is able to take place after a minimum of around 60 µs. It is possible to achieve shorter shutdown times with higher phase angle resolutions.

In this example, the values are then processed at at least 18 kHz.

The current change threshold values may also be stored (in scaled form) in a table, with the value then possibly being adapted.

Although the invention has been described and illustrated in more detail by the exemplary embodiment, the invention is not restricted by the disclosed examples and other variations may be derived therefrom by a person skilled in the art without departing from the scope of the invention.

The invention claimed is:

1. A circuit breaker device for protecting an electrical low-voltage circuit having a temporally sinusoidal voltage characteristic, the circuit breaker device comprising:
   a housing having grid-side and load-side connections for conductors of the low-voltage circuit;
   a voltage sensor for ascertaining a voltage level of the low-voltage circuit and making instantaneous voltage values available;
   a current sensor for ascertaining a current level of the low-voltage circuit and making instantaneous current values available;
   an electronic interruption unit having semiconductor-based switching elements providing a high-resistance state of said switching elements for interrupting and a low-resistance state of said switching elements for allowing a current flow in the low-voltage circuit;
   a control unit connected to said voltage sensor, to said current sensor and to said interruption unit;
   said electronic interruption unit, upon recognition of a load-side short circuit, changing from the low-resistance state to the high-resistance state to interrupt the low-voltage circuit with a trip time from the short-circuit to the high-resistance state, the trip time being shorter than a temporal first threshold value;

periodic instantaneous current change threshold values being dependent on a periodic temporal characteristic of the instantaneous voltage values, and the instantaneous current change threshold values having a temporally sinusoidal current change characteristic with a minimum value greater than zero; and temporal characteristics of the instantaneous voltage values and the current change threshold values being synchronized in terms of phase causing a time of an amplitude of the instantaneous voltage values to match a time of an amplitude of the current change threshold value.

2. The circuit breaker device according to claim 1, wherein a change in the current over time is ascertained from the instantaneous current values, making instantaneous current change values available.

3. The circuit breaker device according to claim 1, wherein the temporally sinusoidal current change characteristic is in terms of absolute value.

4. The circuit breaker device according to claim 1, wherein a region of a zero-crossing of the instantaneous voltage values matches a region of a minimum value of the current change threshold value.

5. The circuit breaker device according to claim 1, wherein:
said control unit has an analog first subunit and a digital second subunit;
said first subunit has a current comparator:
receiving the instantaneous current change values and the instantaneous current change threshold values from said second subunit,
comparing the instantaneous current change values with the instantaneous current change threshold values relative to a phase of a temporal characteristic of the voltage, and
initiating interruption of the low-voltage circuit in an event of the current change threshold values being exceeded.

6. The circuit breaker device according to claim 1, wherein the trip time is shorter than the first temporal threshold value over a full period duration of a voltage.

7. The circuit breaker device according to claim 6, wherein approximately equal trip times are able to be achieved with a small instantaneous voltage and with a large instantaneous voltage.

8. The circuit breaker device according to claim 1, which further comprises at least one single setting element permitting a limit value for a current rise to be set for setting a limit value for the short-circuit recognition.

9. The circuit breaker device according to claim 8, wherein the limit value for the current rise is set depending on a part of the low-voltage circuit connected to said grid-side connection.

10. The circuit breaker device according to claim 8, which further comprises:
a grid synchronization unit ascertaining a phase angle of the voltage from the supplied instantaneous voltage values;
a threshold value unit connected to said grid synchronization unit and to said at least one setting element for ascertaining instantaneous current change threshold values by using a phase angle of the voltage and a set or programmed limit value for a current rise; and
the instantaneous current change values being compared with the instantaneous current change threshold values in terms of phase so as to ascertain initiation of an interruption.

11. The circuit breaker device according to claim 1 wherein the instantaneous current change values are compared with the instantaneous current change threshold values in terms of phase, and upon the instantaneous current change threshold value being exceeded, interruption of the low-voltage circuit is initiated.

12. The circuit breaker device according to claim 11, wherein the exceeding of the current change threshold values must be present for a first time interval to initiate interruption of the low-voltage circuit.

13. The circuit breaker device according to claim 1, wherein the periodic instantaneous current change threshold values have a minimum value greater than zero.

14. The circuit breaker device according to claim 13, wherein the minimum value is greater than 5 to 20% of a maximum value.

15. The circuit breaker device according to claim 1, which further comprises:
a mechanical isolating contact system connected in series with said electronic interruption unit for switching galvanic isolation in the low-voltage circuit;
said mechanical isolating contact system being connected to said control unit.

16. The circuit breaker device according to claim 15, wherein said mechanical isolating contact system initiates galvanic interruption, in addition to interruption by said electronic interruption unit.

17. The circuit breaker device according to claim 15, wherein galvanic isolation is initiated in an event of said electronic interruption unit being a high-resistance electronic interruption unit, or said electronic interruption unit being switched to the high-resistance state, and a current in the low-voltage circuit exceeding a first current threshold value.

18. A method for protecting an electrical low-voltage circuit, the method comprising:
ascertaining a level of a voltage of the low-voltage circuit as instantaneous voltage values;
ascertaining a change in a current over time for making instantaneous current change values available;
providing an electronic interruption unit having a low-resistance state and a high-resistance state; and
comparing the instantaneous current change values with instantaneous current change threshold values for recognizing a short circuit in the low-voltage circuit;
in an event of the current change threshold values being exceeded, changing the electronic interruption unit from the low-resistance state to the high-resistance state for interrupting the low-voltage circuit, with a trip time from the short-circuit event to the high-resistance state, the trip time being shorter than a temporal first threshold value;
upon a temporally sinusoidal voltage characteristic in the low-voltage circuit, providing the instantaneous current change threshold values with a temporally sinusoidal current change characteristic having a minimum value greater than zero; and
synchronizing the temporal characteristics of voltage and current change threshold values in terms of phase causing a time of an amplitude of the voltage to match a time of an amplitude of the current change threshold value.

19. The method according to claim 18, which further comprises:
- comparing the instantaneous current change values with the instantaneous current change threshold values in terms of phase; and
- synchronizing the instantaneous current change threshold values with the temporal characteristic of the instantaneous voltage values, causing small instantaneous current change threshold values to be present in case of a small instantaneous voltage and high current change threshold values to be present in case of a high instantaneous voltage, making the trip time largely independent of the phase angle of the voltage, and the trip time lying below the temporal first threshold value.

20. The method according to claim 18, which further comprises providing the instantaneous current change threshold values with a minimum value greater than zero.

21. The method according to claim 20, which further comprises providing the minimum value as greater than 5 to 20% of a maximum value.

22. The method according to claim 18, which further comprises providing the temporally sinusoidal current change characteristic in terms of absolute value.

\* \* \* \* \*